No. 744,019. PATENTED NOV. 17, 1903.
H. Y. ARMSTRONG.
CARAMEL CUTTING AND WRAPPING MACHINE.
APPLICATION FILED DEC. 18, 1902.
NO MODEL. 6 SHEETS—SHEET 2.

No. 744,019. PATENTED NOV. 17, 1903.
H. Y. ARMSTRONG.
CARAMEL CUTTING AND WRAPPING MACHINE.
APPLICATION FILED DEC. 18, 1902.
NO MODEL. 6 SHEETS—SHEET 6.

Witnesses:
Harold G. Barrett
Harry J. Cromir

Inventor:
Harry Y. Armstrong.
By Thomas F. Sheridan
Atty'h.

No. 744,019.

Patented November 17, 1903.

UNITED STATES PATENT OFFICE.

HARRY Y. ARMSTRONG, OF ELGIN, ILLINOIS, ASSIGNOR TO FRANK M. PETERS, OF CHICAGO, ILLINOIS.

CARAMEL CUTTING AND WRAPPING MACHINE.

SPECIFICATION forming part of Letters Patent No. 744,019, dated November 17, 1903.

Application filed December 18, 1902. Serial No. 135,732. (No model.)

*To all whom it may concern:*

Be it known that I, HARRY Y. ARMSTRONG, a citizen of the United States, residing at Elgin, in the county of Kane and State of Illinois, have invented certain new and useful Improvements in Caramel Cutting and Wrapping Machines, of which the following is a specification.

The invention relates to that class of machines which is used for the purpose of receiving or taking candy caramel-strips or substances of similar plasticity, cutting them into blocks or cubes of the desired size and shape, and wrapping or folding paper around them to prepare them for shipment, and is intended to be an improvement upon the mechanisms shown, described, and claimed in Letters Patent of the United States No. 691,737, granted to me the 28th day of January, 1902.

The principal object of the invention is to provide a simple, economical, and efficient machine for cutting a strip of candy caramel or similar plastic substances in desired cubes; and the invention consists in the features, combinations, and details of construction hereinafter described and claimed.

In the accompanying drawings, Fig. 6, a vertical sectional view taken on line 6 of Fig. 4 looking in the direction of the arrow, and Fig. 7 a perspective view of a part of the sizing mechanisms shown at the right-hand side of Fig. 6.

In illustrating and describing these improvements I have illustrated practically the complete machine and will describe in detail all that I consider to be new, taken in connection with so much as is old as will properly disclose the invention to others and enable those skilled in the art to practice the same, leaving out of consideration other and well-known mechanisms, which if set forth in detail herein would only tend to confusion, prolixity, and ambiguity. It will be understood, however, that such mechanisms as are left out of detailed description herein are fully shown and described in my former patent, above referred to, reference to which may be had for more complete and fuller details if considered necessary.

Figure 1:
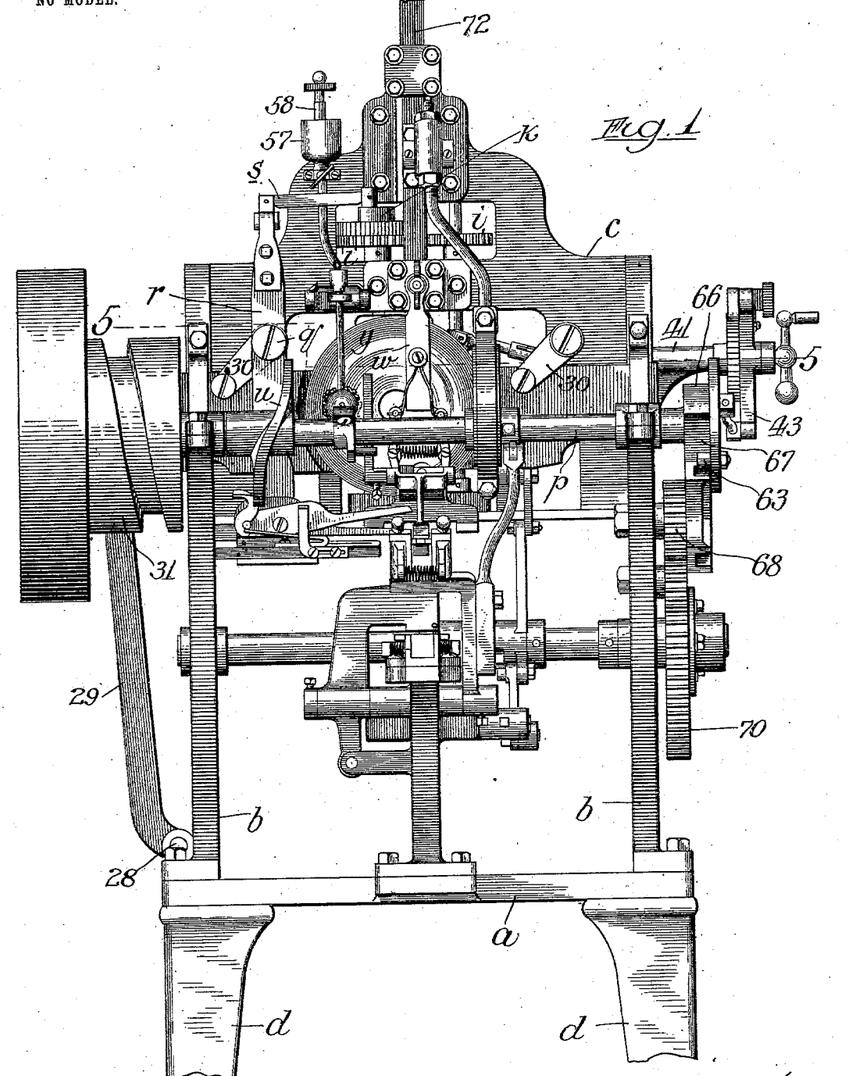
Figure 1 is a front elevation of a machine constructed in accordance with these improvements.
Figure 3:
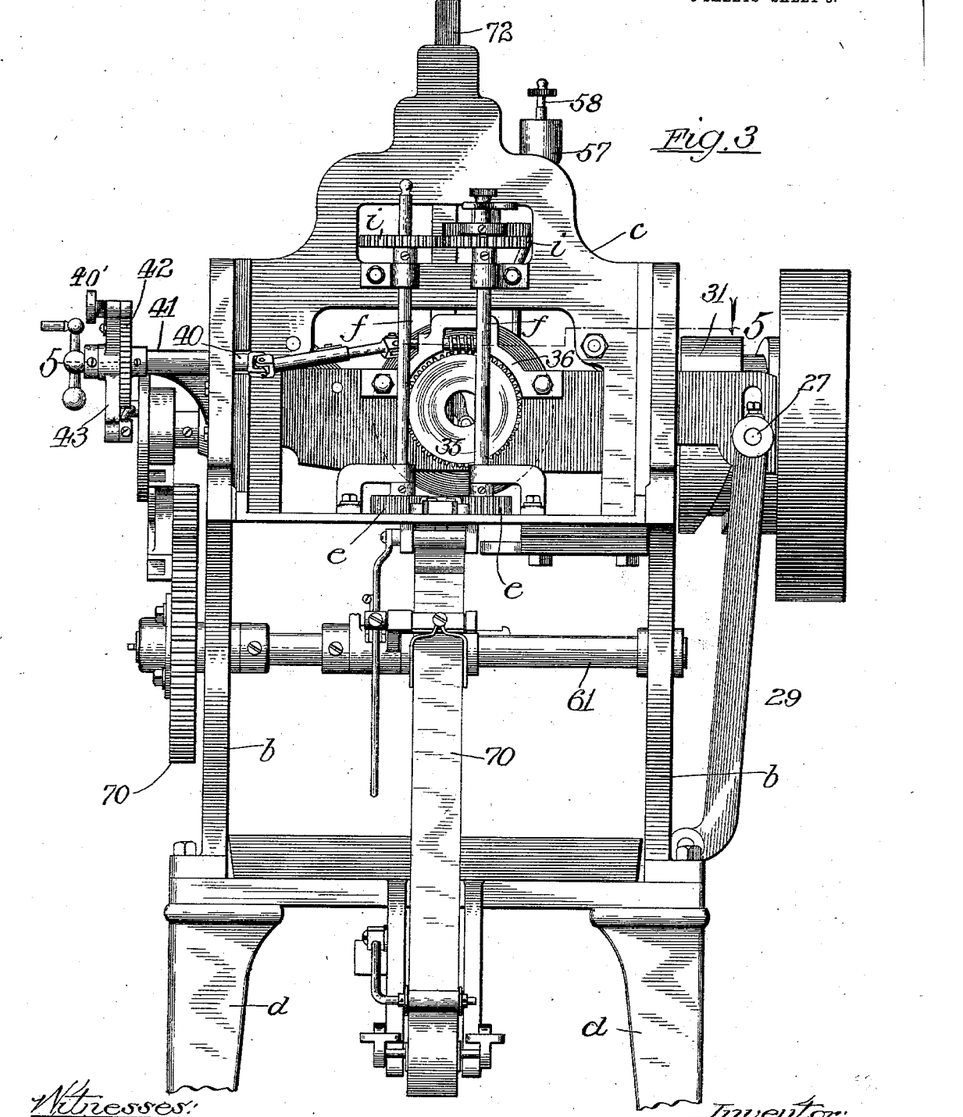
Fig. 3, a rear elevation of the machine.
Figure 4:
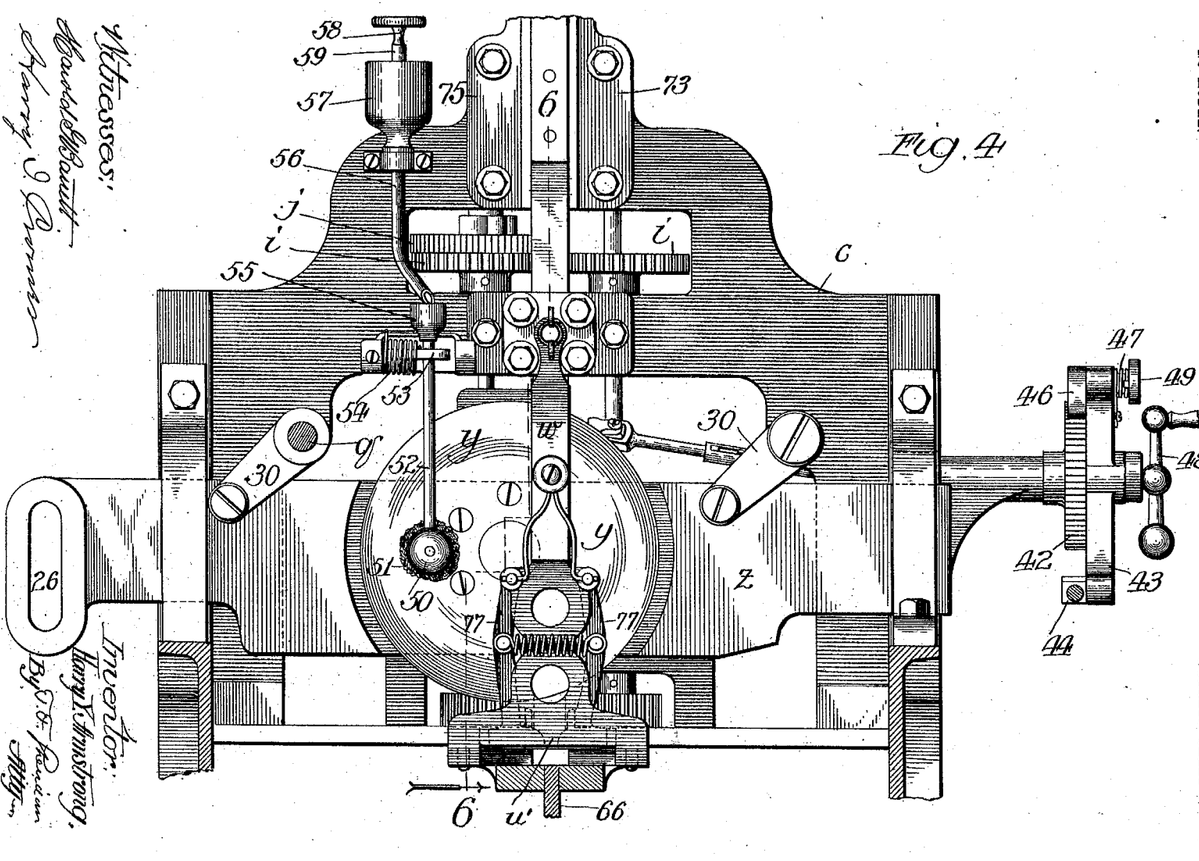
Fig. 4, an enlarged elevation of a portion of the machine, showing the cutting and adjacent mechanisms, taken at about line 4 of Fig. 5 looking in the direction of the arrow.
Figure 5:
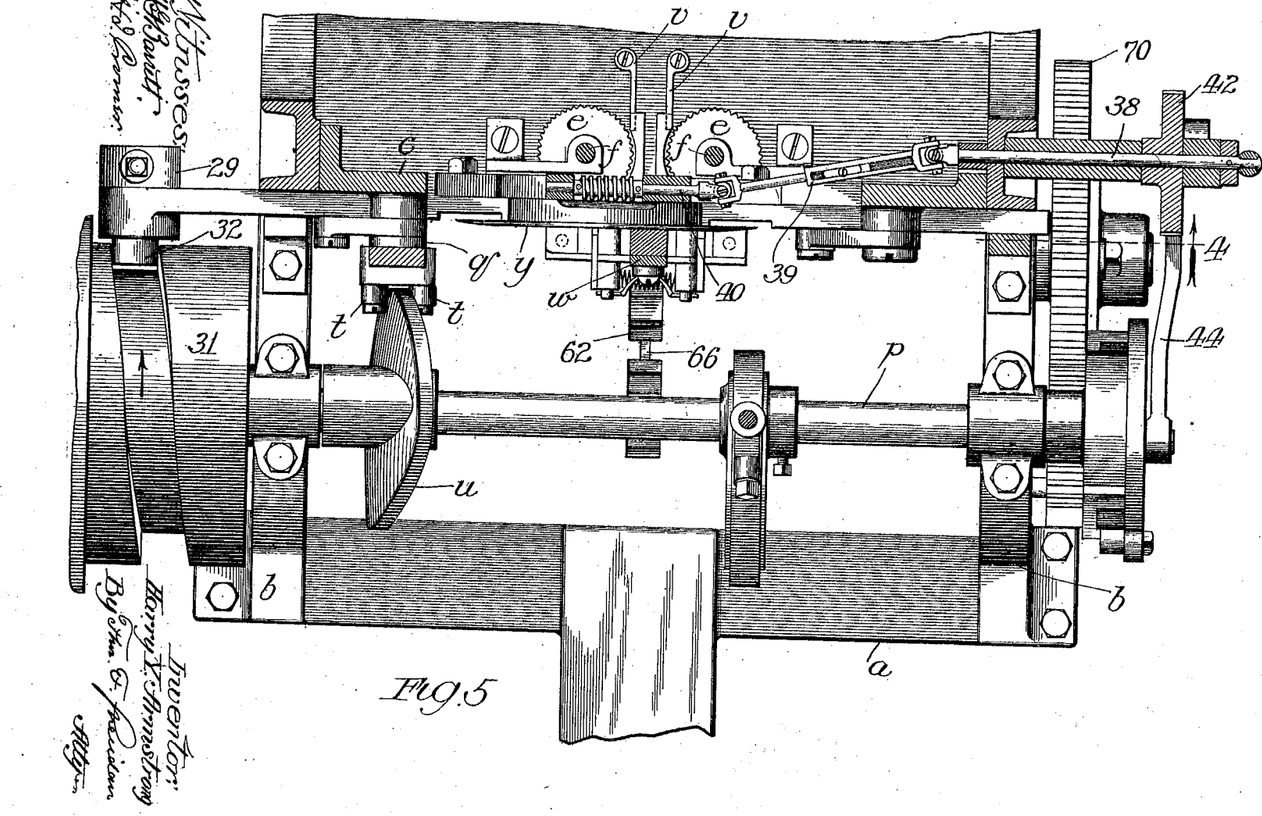
Fig. 5, an enlarged cross-sectional plan view taken on line 5 of Fig. 1 looking at the parts from above.

In constructing a machine in accordance with these improvements a frame portion is provided comprising a bed $a$, having upright pillars or standards $b$ secured thereto and joined together at or near their top portion by an angle-plate $c$, the bed being supported upon legs $d$, all of the desired size, shape, and strength to hold the operative and other parts in position. It will be understood that in this class of machines it is desirable to first form or cut the candy into strips of the desired length and thickness, so that it can be readily fed into the machine for the purpose of being cut into cubes and wrapped in paper to form the desired sized packages. To feed the candy into the machine, a pair of indented feed-wheels $e$ is provided and mounted upon the horizontal portion of the angle-plate adjacent to the forward edge thereof, as shown particularly in Figs. 3 and 5, so that they rotate in a horizontal plane and provide a space between them through which a strip of candy may be passed into engagement with the operative mechanisms hereinafter described. To drive these rolls, a pair of shafts $f$ is provided of a diameter such as shown in Fig. 5. To rotate these feed-shafts, a pair of intermeshing gears $i$ is provided (see Figs. 1 and 4) and secured to the shafts, at or near the upper end thereof, so that the rotation imparted to either one of these gears is likewise imparted to the other. It will be understood that it is necessary only to impart a motion primarily to one of these gears. In order to accomplish this, one of such gears, preferably the one to the left, as shown in Figs. 1 and 4, is provided with a ratchet-wheel $j$, which is secured thereto. Pivotally mounted upon a vibratable lever $k$ is a pawl $l$, arranged to engage the ratchet-wheel, so that as the pawl-lever is operated in one direction it moves its pawl to engage and rotate the ratchet-wheel in the same direction, and as it is vibrated in the opposite direction it permits the pawl to slide over the teeth of the ratchet-wheel. A tension-spring m is provided, one end of which is secured to the ratchet-wheel and the other arranged to engage with flattened surfaces upon the pivot-pin n of the pawl and yieldingly hold such pawl either in or out of engagement with the ratchet-wheel, as circumstances may require. The upper end of this pawl pivot-pin is provided with a knurled head o, which the operator can grasp between the thumb and finger for the purpose of throwing the pawl into or out of engagement with the ratchet-wheel, and thereby provide for the stopping or starting of the candy-feeding, which may be very desirable at times.

To provide for the movement and operation of the vibratable pawl-lever, ratchet, and other parts above described, a main shaft p is provided and rotatably mounted in suitable brackets secured to the vertical portion of the angle-plate, as shown particularly in Figs. 1 and 5. Vibratingly mounted on this angle-plate upon a stud q is an intermediate lever r, the upper end of which is connected to the pawl-lever by means of a connecting-link s, which has a knuckle-joint in engagement with both of the levers, as generally shown, particularly in Fig. 1. The lower portion of this intermediate vibratable lever r is provided with a pair of rolls t, straddling a plate-cam u, as shown particularly in Fig. 5, which plate-cam is rigidly secured to the main driving-shaft, so that as such shaft rotates the intermediate vibratable lever is vibrated, which transfers the vibrating motion to the vibratable pawl-lever and through it to the other parts. The horizontal portion of the angle-plate is also provided with a pair of guides v, (shown particularly in Figs. 5 and 6,) between which the candy strip is fed into the feed-wheels. The inner upper ends of these guiding-strips are provided with inwardly-extending flanges h, which practically act as strippers to prevent the candy from lifting up when the candy-cutter, hereinafter described, has cut off the candy cube. The insertion of the candy strip is limited by a stop-bracket w, (shown particularly in Figs. 4, 6, and 7,) which in turn is secured to a bracket x, projecting out from underneath the angle-plate, as shown in such figures.

Figure 2:
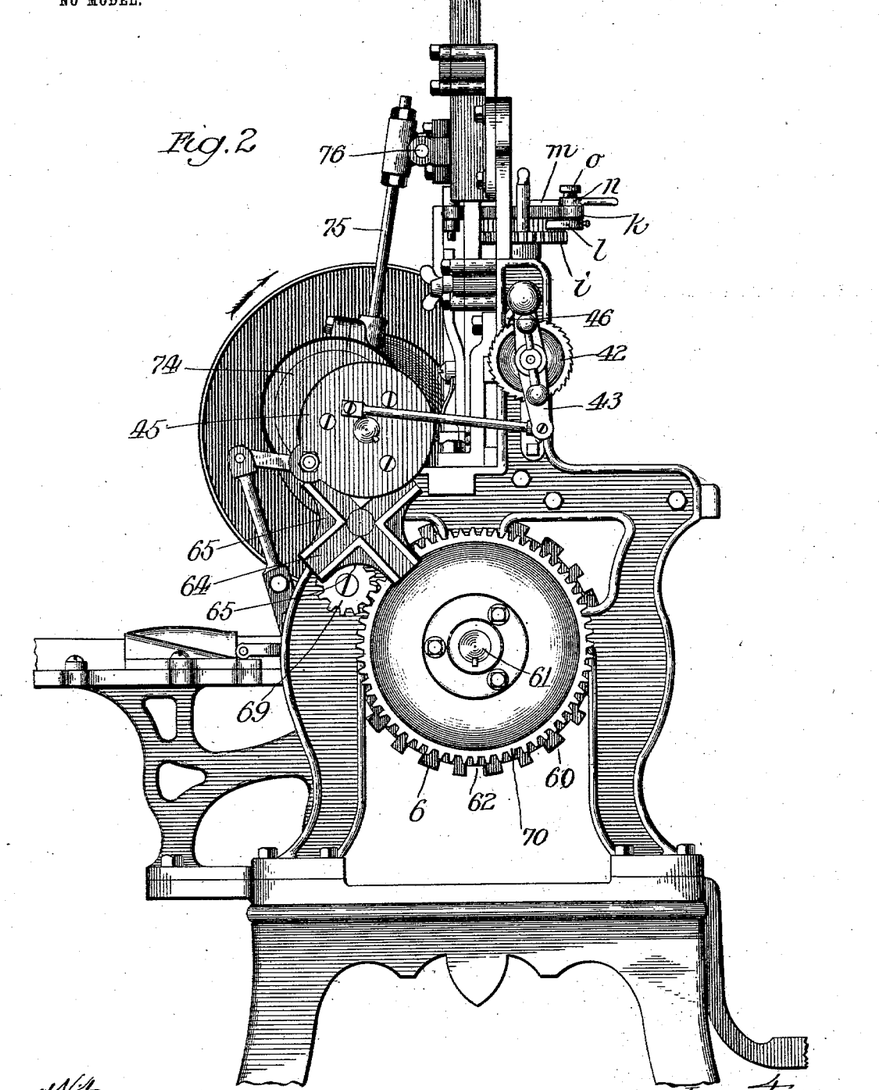
Fig. 2, a side elevation looking at the mechanisms from the right-hand side of Fig. 1.

It is now desirable to cut the candy into the desired cubes and to provide a cutter which will present successively a different cutting portion to each and every cube of candy as it is cut. For this purpose a circular cutting-blade y is provided and rotatably secured to and mounted on a parallel movable cutter-supporting bar z, which in turn is movably secured to the platform portion of the angle-plate by means of a pair of links 30, so as to impart what might be termed a "parallel" motion to the bar and its rotatable cutter—that is, a downward motion to the right of Fig. 4 to cut the candy, much as an ordinary knife is used, and then an upward motion to the left to release the candy. In order to give this motion to the cutter-supporting bar at the desired time or times, a grooved cam 31 is provided and secured to the main driving-shaft, as shown particularly in Figs. 1 and 5, the groove of which engages with a roll 32, projecting out from and secured to the upper end of an intermediate lever 29. (Shown particularly in Figs. 3 and 5.) The lower end of this intermediate lever is pivotally mounted on the frame portion of the machine at 28, and the roll 32, above described, is rotatably mounted upon a pin 27, extending through the upper part of the lever, which pin extends through a slot or groove 26 in the left-hand end of the cutter-supporting bar. It will be seen, therefore, from the foregoing description that as the main shaft is rotated to the left or in the direction indicated by the arrow in Figs. 2 and 5 this intermediate cutter-bar lever is vibrated, and during its vibrations the parallel cutter-supporting bar, with its rotatable cutter, is given the parallel motions above described at the proper time to cut the candy.

It is desirable to provide means to give the circular cutter a rotary motion as each and every cube of candy is cut, and successively. To accomplish this, the circular cutter, as above suggested, is rotatably mounted in the parallel supporting-bar, as shown particularly in Fig. 6, and secured to a hub 33 by means of a plurality of screws 34, which hub passes through to the other side of the supporting-bar and is provided with a worm-wheel 35, forming an integral part thereof. Rotatably mounted in a suitable bracket 36 on the cutter-bar is a worm 37, arranged to be rotated by and during the rotations of a shaft 38 through the intermediary of an extensible connecting link or rod 39, having a knuckle-joint connection with the worm-wheel shaft 40 and with the operating-shaft 38. This operating-shaft is rotatably mounted or journaled in a bracket 41, its outer end being provided with a ratchet-wheel 42, which is rigidly secured thereto, so as to partake of the same rotations and impart its rotations to the operating-shaft. Loosely and vibratingly mounted on and at or near the outer edge of this shaft is a vibratable pawl-lever 43, one end of which is connected by means of the connecting-rod 44 with a crank-plate 45, in turn mounted upon the main driving-shaft. The other end of this pawl-lever is provided with a spring-pressed pawl 46, arranged to engage the teeth of the ratchet-wheel, and as the vibratable pawl-lever is moved in one direction through the intermediary of its spring 47 its free end is held in yielding engagement with the ratchet-teeth, so as to operate the rod in the same direction; but when the vibratable pawl is moved in the other direction the spring-pressed pawl is permitted to pass freely over the teeth and not move such ratchet.

From the foregoing description of construction and arrangement of parts it will be seen that as the main shaft is operated and during each rotation the parallel movable cutter-supporting bar, with its cutter, is moved down into engagement with and to cut a cube of candy from the strip and is moved upwardly therefrom; further, that during one rotation of the main shaft the vibratable pawl-lever is vibrated and moved forward to rotate the ratchet one step, and thereby rotate the worm and worm-wheel with the circular cutter one step in its rotation, presenting a new cutting-face of the circular cutter for the purpose of contacting and cutting the next cube of candy. It will also be apparent to those skilled in the art that this is a great advantage, in that a fresh cutting-surface free from all gum and sticky substances is presented to and cleanly cuts the next cube of candy.

The extreme outer edge of the operating-shaft 40 is provided with a crank-handle 48, rigidly secured thereto, so that the operating-shaft, and thereby, through the intermediary of the other mechanism described, the circular cutter, may be rotated in either direction desired by the rotation of this crank-handle—in the one direction freely, and in the opposite direction by lifting the spring-pressed pawl 46 through the intermediary of the knurled head 40' such parts may be rotated.

It is well known in this art that more or less candy, gum, and residue will stick to the cutter, and particularly to the outer tapered face which does the cutting. In order, therefore, to provide means by which this surface or face may be kept clean, I provide a wiper formed of a cup-shaped receptacle 50, holding a sponge or piece or felt or other fibrous material 51. This hollow holder is provided with a tube 52, mounted in a rod 53, having a helical coil-spring 54, which keeps the sponge or other fibrous material yieldingly pressed against the surface of the cutter. The upper part of this tube is provided with a cup 55, arranged directly under the tube or spout 56 of a reservoir 57, in which the water or other liquid for cleaning the cutter may be kept. This reservoir has a plug 58 in screw-threaded engagement with the upper portion 59 of the reservoir, so that its lower end, which may be pointed, but is not shown, is arranged directly in line with the opening in the feed-spout 56, so as to control the cleansing liquid discharging therethrough. From this description of construction and arrangement it will be seen that as the circular cutter is rotated it is likewise cleansed, so as to present a clean cutting-surface to the candy, as above described.

After the strip of candy has been cut at one end into the desired cube it is advanced into contact with a rotatable head 60, (see Figs. 2 and 5,) which is mounted upon a rotatable supporting-shaft 61, in turn mounted in suitable bearings in the standard of the machine. This supporting-shaft is mounted parallel with the main driving-shaft and is arranged to rotate the rotatable head in a vertical plane and directly in the path in which the candy strip travels and is provided with a plurality of holding-pockets 62, each of which is arranged in turn to be brought into position successively directly under the cut cube of candy. This rotatable shaft, with its head, is constructed exactly as shown and described in my former patent above referred to. It is desirable to give this rotatable head a step-by-step rotation. To accomplish this, the crank-plate 45, already described, is provided with a roll or pin 63, adapted to engage with a plate having two grooves or slots 64 in its face arranged at right angles to each other and in the shape of a cross, so that as the main driving-shaft makes one rotation this grooved plate is engaged by the roll or pin 63 and rotated one step—viz., one-fourth of a complete rotation—when the trunnion or roll passes out of engagement therewith. The portion of the plate between each of these grooves in the grooved plate is provided with a semicircular indentation in the periphery, adapted to be engaged by the circular portion of a stop-disk 66, (shown particularly in Figs. 1 and 5,) so that such grooved plate is prevented from rotation at all times and until the roll or trunnion 63 engages with another portion of its slotted face, when its larger diameter is permitted to pass through a crescent-shaped cut or passing hollow 67 in the stop-disk 66. This grooved plate is provided with a spur-gear 68, meshing with an intermediate spur-pinion 69, which in turn meshes with a spur-gear 70 on the rotatable supporting-shaft 61, upon which the head 60 is mounted, as already described. These spur-gears bear such a relation to each other, particularly the driving and the driven, that one-fourth of the rotation of the grooved plate imparts such a motion to the gear 70 as to move the rotatable head in such manner as to bring the empty pocket under that portion of the machine to receive the next cube of candy after it is cut.

The means for bringing the strip of paper 71 (shown in Fig. 3) into position underneath and adjacent to the cut cube of candy, so that it may be folded around the same during the rotations of the rotatable head, and the means for folding and wrapping the paper around such cube and discharging it are exactly the same as that shown and described in connection with my former patent above named, so that it is unnecessary to describe the same herein in detail. The same is true as regards the mechanism for receiving the completed package and discharging it out of the machine, all of which is already disclosed and needs no further description here.

Figures 6, 7:
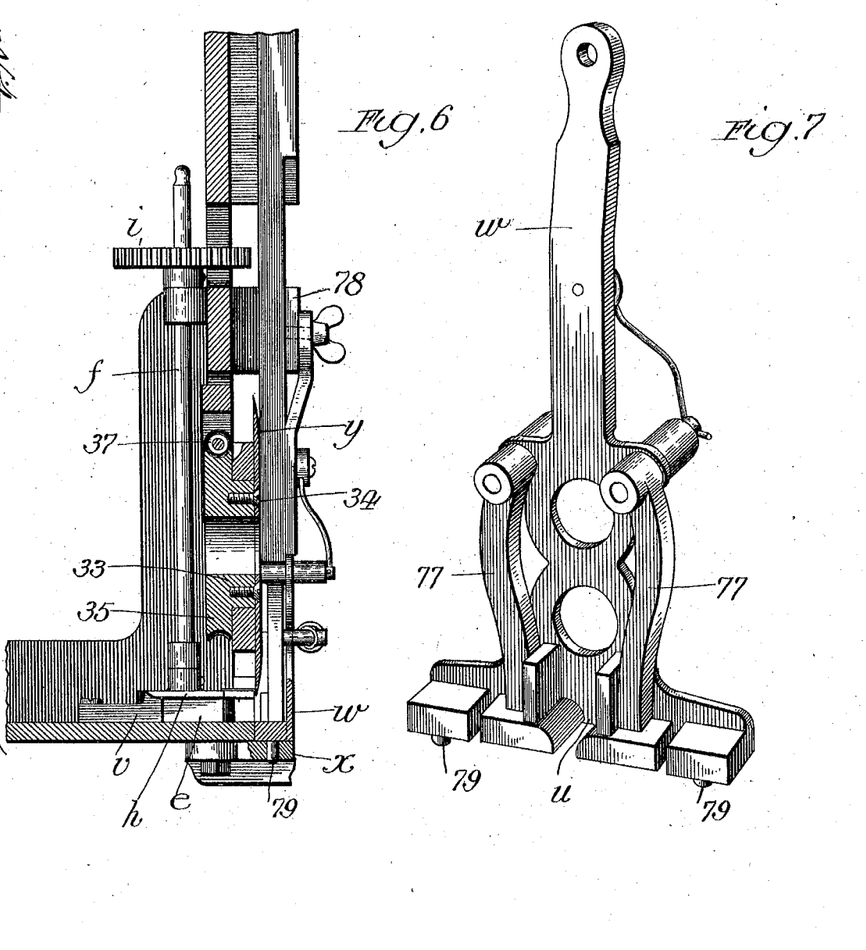

The means for forcing the candy cube into contact with the paper and into its holding-pocket 62 is a plunger 72, which is slidingly mounted in guides 73, secured to the angle-plate c, as shown particularly in Figs. 1 and 4. This plunger is given its reciprocating motions by means of an eccentric 74 and an eccentric strap and rod 75, having a pivotal engagement therewith at 76, all substantially the same as shown and described in my former patent. The lower end of this plunger pushes the cut cube of candy between a pair of vibratable sizing-levers 77 (shown particularly in Figs. 6 and 7) in a manner similar to that shown and described in connection with my former patent. These vibratable sizing-levers are pivotally mounted, as shown in Fig. 7, upon a stop-bracket u, which bracket is in turn detachably secured at its upper end to one of the guides 78, which holds the plunger in its position, while the lower ends of such brackets are provided with dowel-pins 79, engaging with perforations or holes in brackets x, hereinbefore described, the arrangement being such that the stop-bracket, with its sizing-levers, may be readily removed from the machine for purposes of repair or cleaning of the parts.

I claim—

1. In a machine of the class described, the combination of means for feeding a strip of candy material into the machine, means for cutting the strip of material into cubes, consisting of a circular candy-cutter, a swinging supporting mechanism upon which such circular cutter is rotatably mounted, means for moving such swinging supporting mechanism and thereby the cutter into and out of contact with the candy strip to cut it by such movement, and means for imparting a step-by-step rotation to such cutter during the operation of the machine, substantially as described.

2. In a machine of the class described, the combination of means for feeding a strip of candy into the machine, a circular candy-cutter, a swinging supporting-bar on which such cutter is rotatably mounted, means for swinging such bar and thereby throwing the circular cutter into contact with the strip of candy transversely thereof to cut it by such swinging movement and out of engagement therewith to permit the candy to be fed past such cutter, and means for imparting a step-by-step rotation to such cutter during the operation of the machine, substantially as described.

3. In a machine of the class described, the combination of means for feeding a strip of candy into the machine, a circular candy-cutter, a parallel movable supporting-bar upon which such cutter is rotatably mounted, means for swinging the parallel movable supporting-bar and thereby throwing the circular cutter into and out of cutting engagement with the candy strip to cut the candy and remove the cutter therefrom by such movement of the supporting-bar, and worm-and-gear mechanism for imparting a step-by-step rotation to the circular cutter during the operation of the machine, substantially as described.

4. In a machine of the class described, the combination of means for feeding a strip of candy into the machine, a circular candy-cutter, a parallel movable bar, a worm-wheel rotatably mounted in such parallel movable bar and to which the circular cutter is secured, means for operating the parallel movable bar, an arm rotatably mounted on the parallel movable bar and meshing with the worm-wheel, and pawl-and-ratchet mechanism for imparting a step-by-step rotation to the worm and its wheel and thereby to the candy-cutter during the operation of the machine, substantially as described.

5. In a machine of the class described, the combination of means for feeding a strip of candy into the machine, a circular candy-cutter, a parallel movable bar, a worm-wheel to which the circular cutter is removably secured rotatably mounted in the parallel movable bar, a worm with its shaft rotatably mounted on the parallel movable bar meshing with the worm-wheel, an operating-shaft rotatably mounted in the frame of the machine, an extensible and collapsible connecting-shaft having a universal joint connecting with both worm and operating shafts, a ratchet-wheel on the operating-shaft, a vibratable lever provided with a pawl in engagement with the ratchet-wheel to rotate it in a step-by-step manner, a main driving-shaft, and mechanism connected with the main driving-shaft for vibrating the pawl-lever, substantially as described.

6. In a machine of the class described, the combination of means for feeding a strip of candy into the machine, a candy-cutter, a parallel movable bar upon which the candy-cutter is mounted and provided with an elongated slot near one end, a pair of links for holding such parallel movable bar in position, an operating-lever pivoted to the frame and engaging the elongated slot, and a cam for vibrating the operating-lever and thereby the parallel movable bar, substantially as described.

7. In a machine of the class described, the combination of means for feeding a strip of candy into the machine, a candy-cutter, a parallel movable bar upon which the candy-cutter is mounted and provided with an elongated slot near one end, a pair of swinging links for supporting the parallel movable bar, an operating-lever pivotally mounted in the frame of the machine and provided with a projection passing through the elongated slot of the parallel movable bar, and a circumferentially-grooved cam engaging the projection on the operating-lever to vibrate the same and thereby impart power and motion to the parallel movable bar, substantially as described.

8. In a machine of the class described, the combination of means for feeding a strip of candy into the machine, a circular candy-cutter, a parallel movable bar upon which the candy-cutter is rotatably mounted, means for imparting a step-by-step rotation to the candy-cutter, a holder provided with a cleaner formed of absorbent material held against the candy-cutter to clean the same, and means for feeding liquid to such cleaner, substantially as described.

9. In a machine of the class described, the combination of means for feeding a strip of candy into the machine, a circular candy-cutter, a parallel movable bar upon which the candy-cutter is rotatably mounted, means for imparting a step-by-step rotation to the candy-cutter, a cup-shaped holder provided with cleaning material, such as a sponge, a tube for feeding cleansing liquid to such sponge, and spring mechanism for yieldingly holding the cleaner-holder with its sponge against the face of the candy-cutter to cleanse the same, substantially as described.

10. In a machine of the class described, the combination of means for feeding a strip of candy material into the machine, a stop-bracket removably secured to the machine for limiting the insertion of the candy, and pivoted sizing-levers mounted thereon, substantially as described.

11. In a machine of the class described, the combination of a rotatable candy-holding head provided with a plurality of holding-pockets in its periphery, means for forcing the candy cubes into such pockets, a main driving-shaft, a rotatable supporting-shaft upon which the holding-head is mounted and by which it is rotated, a driven gear on the last-named shaft, a rotatable plate provided with cross-shaped grooves in its face, a driving-gear operated by such grooved plate for operating the driven gears on the rotatable supporting-shaft, a crank-plate on the main shaft provided with a projection to engage the grooves in the face of the grooved plate and rotate it in a step-by-step manner, and means for holding such grooved plate against rotation when the crank-plate projection is out of engagement therewith, substantially as described.

HARRY Y. ARMSTRONG.

Witnesses:
CHARLES W. LEHMANN,
HOMER KING.